United States Patent
Miura et al.

(10) Patent No.: US 10,569,787 B2
(45) Date of Patent: Feb. 25, 2020

(54) DRIVING SUPPORT APPARATUS, DRIVING SUPPORT METHOD, AND RECORDING MEDIUM

(71) Applicant: DENSO CORPORATION, Kariya, Aichi-pref. (JP)

(72) Inventors: Takeshi Miura, Kariya (JP); Masayoshi Oishi, Kariya (JP); Hiroaki Niino, Kariya (JP); Koji Fujiki, Kariya (JP); Shotaro Fukuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/084,389

(22) PCT Filed: Mar. 13, 2017

(86) PCT No.: PCT/JP2017/009987
§ 371 (c)(1),
(2) Date: Sep. 12, 2018

(87) PCT Pub. No.: WO2017/159617
PCT Pub. Date: Sep. 21, 2017

(65) Prior Publication Data
US 2019/0084581 A1 Mar. 21, 2019

(30) Foreign Application Priority Data
Mar. 14, 2016 (JP) .................... 2016-049616

(51) Int. Cl.
*B60W 30/09* (2012.01)
*B60W 50/00* (2006.01)
(Continued)

(52) U.S. Cl.
CPC ........ *B60W 50/0205* (2013.01); *B60W 30/09* (2013.01); *B60W 50/00* (2013.01);
(Continued)

(58) Field of Classification Search
CPC .............. B60W 5/0205; B60W 50/00; B60W 50/0225; B60W 50/14; B60W 2420/42; B60W 2420/52; B62D 6/00
(Continued)

(56) References Cited

U.S. PATENT DOCUMENTS 10,220,857 B2* 3/2019 Jones .................... B60W 10/18
2006/0089770 A1* 4/2006 Ito .......................... B62D 1/286
701/41
(Continued)

FOREIGN PATENT DOCUMENTS

JP 2006-117181 A 5/2006
JP 2009-214680 A 9/2009
(Continued)

*Primary Examiner* — Yazan A Soofi
(74) *Attorney, Agent, or Firm* — Knobbe, Martens, Olson & Bear, LLP (57) ABSTRACT

A driving support apparatus includes a driving support unit, a switching control unit, a reliability detection unit, and a threshold lowering unit. The switching control unit ceases driving support by the driving support unit and switches a driving state from driving in which the driving support is performed to manual driving, according to input from an operation detection unit when operating force or an operation amount exceeds a threshold. The reliability detection unit detects degradation of reliability of the driving support by the driving support unit. The threshold lowering unit lowers the threshold when the reliability detection unit detects the degradation of the reliability.

6 Claims, 8 Drawing Sheets (51) Int. Cl.
  *B60W 50/02* (2012.01)
  *B60W 50/14* (2012.01)
  *B62D 6/00* (2006.01)
(52) U.S. Cl.
  CPC ........ *B60W 50/0225* (2013.01); *B60W 50/14* (2013.01); *B62D 6/00* (2013.01); *B60W 2420/42* (2013.01); *B60W 2420/52* (2013.01); *B60W 2510/20* (2013.01)
(58) Field of Classification Search
  USPC ....................................................... 701/29.2
  See application file for complete search history.

(56) References Cited

U.S. PATENT DOCUMENTS

| | | | | |
|---|---|---|---|---|
| 2015/0112470 | A1* | 4/2015 | Chang | G05B 19/401 |
| | | | | 700/109 |
| 2017/0113664 | A1* | 4/2017 | Nix | G06F 11/3072 |
| 2018/0022354 | A1* | 1/2018 | Akatsuka | B60W 10/04 |
| 2018/0348779 | A1* | 12/2018 | Oniwa | B62D 15/025 |
| 2019/0071101 | A1* | 3/2019 | Emura | G08G 1/09 |
| 2019/0080606 | A1* | 3/2019 | Niwa | B60W 50/00 |

FOREIGN PATENT DOCUMENTS

| | | |
|---|---|---|
| JP | 2010-173601 A | 8/2010 |
| JP | 2010-208472 A | 9/2010 |
| JP | 2015-182606 A | 10/2015 |

\* cited by examiner

DRIVING SUPPORT APPARATUS, DRIVING SUPPORT METHOD, AND RECORDING MEDIUM

CROSS-REFERENCE TO RELATED APPLICATION

The present application is a national stage application under 35 U.S.C. § 371(c) of PCT Application No. PCT/JP2017/009987, filed on Mar. 13, 2017, which claims priority to Japanese Patent Application No. 2016-49616 filed in the Japanese Patent Office on Mar. 14, 2016, the entire contents of which are incorporated herein by reference.

TECHNICAL FIELD

The present disclosure relates to a technique for supporting driving operation of a vehicle by a driver. Note that, herein, equipment which relates to traveling of a vehicle, such as a steered wheel, a throttle valve, and a wheel cylinder, among equipment mounted to or installed in the vehicle, and which is driven in response to driving operation, will be referred to as an in-vehicle equipment.

BACKGROUND ART

Conventionally, a driving support apparatus which supports driving operation of a vehicle by a driver by automatically driving in-vehicle equipment (for example, a steered wheel) related to traveling of the vehicle is known. Further, in this type of the driving support apparatus, it has been considered that, when an operation unit, which is operated by the driver to cause the in-vehicle equipment to operate to perform driving operation, is operated with operating force or an operation amount exceeding a threshold, driving support is ceased, and a driving state is switched to manual driving. For example, PTL 1 discloses an apparatus which ceases driving support and switches a driving state to manual driving when torque equal to or greater than a threshold is applied to a steering wheel by a driver during the driving support for driving the steering wheel with a motor so that a vehicle is kept in a travel lane. Further, in the apparatus disclosed in PTL 1, the threshold is changed in accordance with whether the driver holds the steering wheel lightly or tightly, or the like.

CITATION LIST

Patent Literature

[PTL 1] JP 2009-214680 A

SUMMARY OF THE INVENTION

However, with the apparatus disclosed in PTL 1, special control is to not performed when driving support must be ceased due to an abnormality, or the like, on the driving support apparatus side, and only threshold control similar to that performed when driving support is ceased, in response to the driver's desire for changing a lane, or the like, is performed. Through intensive studies, the inventors have found out that when an abnormality or the like occurs in the driving support apparatus, and reliability of driving support has degraded, although it is necessary to cease driving support and switch a driving state to manual driving, such switching is required to be performed safely and more smoothly.

The present disclosure provides a technique for smoothly performing processing of ceasing driving support and switching a driving state to manual driving when the reliability of driving support has degraded in a driving support apparatus which supports a driver's driving operation of a vehicle.

A driving support apparatus according to an aspect of the present disclosure includes a driving support unit, a switching control unit, a reliability detection unit, and a threshold lowering unit. The driving support unit is configured to perform driving support for automatically driving in-vehicle equipment related to traveling of a vehicle under a condition that an operation unit of the vehicle is not operated by a driver of the vehicle. The switching control unit is configured to cease the driving support by the driving support unit and switch a driving state from driving in which the driving support is performed to manual driving in which the in-vehicle equipment is driven in response to operation of the operation unit by the driver, according to input from an operation detection unit which detects operating force or an operation amount of operation performed by the driver with respect to the operation unit, in a case where the operating force or the operation amount exceeds a threshold when the driving support is performed by the driving support unit. The reliability detection unit is configured to detect degradation of reliability of the driving support by the driving to support unit. The threshold lowering unit is configured to lower the threshold in a case where the reliability detection unit detects that the reliability has degraded when the driving support is being performed.

According to such a configuration, when the reliability detection unit detects that the reliability of the driving support has degraded during the driving support by the driving support unit, the threshold lowering unit lowers the threshold. By this means, the operating force or the operation amount exceeds the threshold even if the driver does not operate the operation unit with a relatively large operating force or operation amount, and processing of ceasing the driving support and switching a driving state to manual driving is performed by the switching control unit. Therefore, when the reliability of the driving support has degraded, it is possible to cease the driving support and switch the driving state to manual driving more smoothly.

Reference signs in parentheses in the claims indicate correspondence with the specific means described in the following embodiment as a mode, and do not limit the technical scope of the present disclosure.

DESCRIPTION OF EMBODIMENTS

With reference to the drawings, embodiments to which the present disclosure is applied will be described below.

[1. First Embodiment]

[1-1. Configuration]

Figure 1:
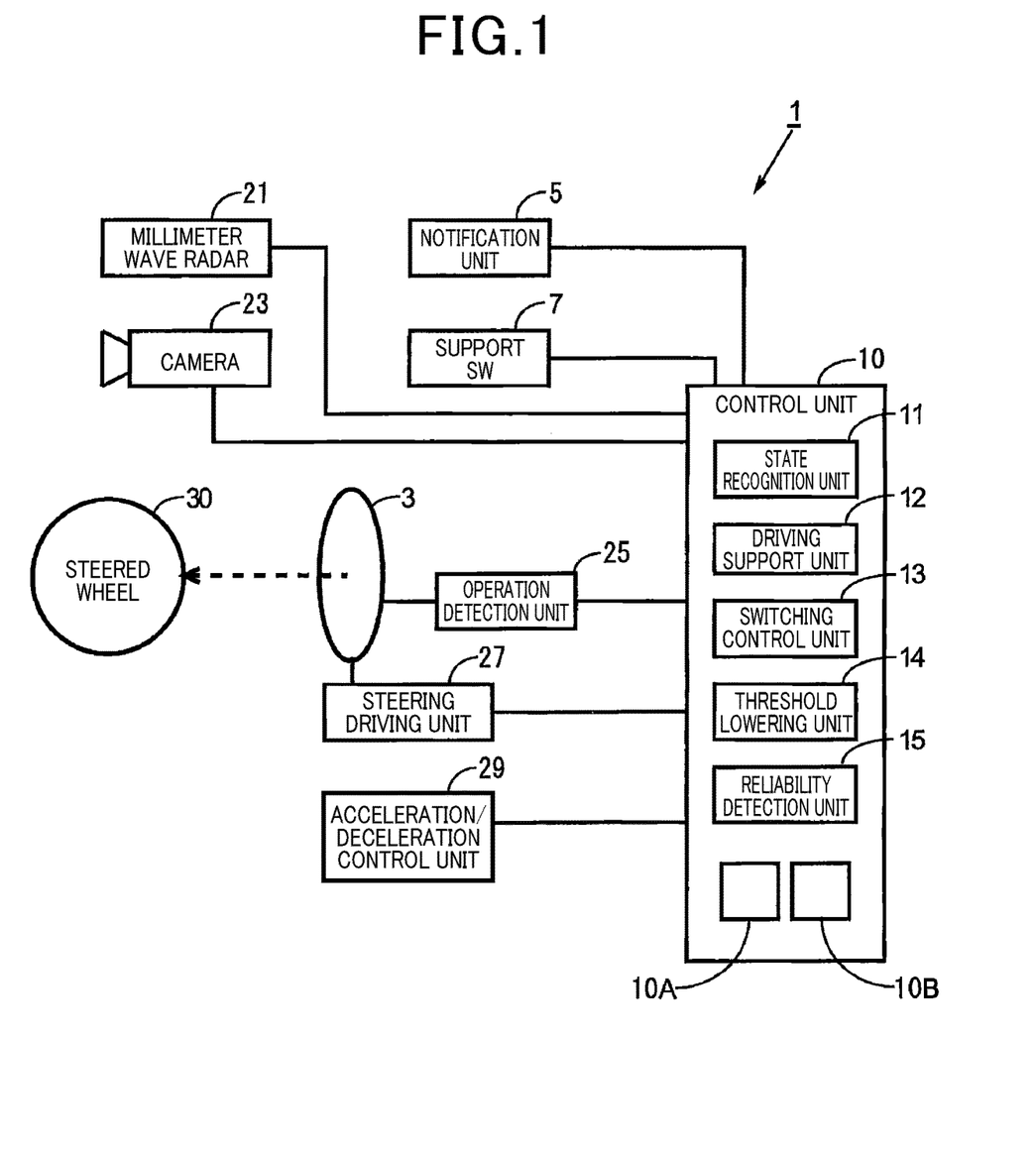
FIG. 1 is a block diagram illustrating a configuration of a driving support apparatus according to a first embodiment.

A driving support apparatus 1 illustrated in FIG. 1, which is an apparatus mounted to a vehicle, includes a steering wheel 3, a notification unit 5, a support switch 7, a control unit 10, a millimeter wave radar 21, a camera 23, an operation detection unit 25, a steering driving unit 27, and an acceleration/deceleration control unit 29. Note that, in respective drawings including FIG. 1, a support switch is expressed as "support SW". Among these components, the steering wheel 3, the notification unit 5, and the support switch 7 are provided inside an interior of the vehicle (hereinafter, also referred to as an own vehicle).

The steering wheel 3 is a well-known component which changes a direction of a steered wheel 30 via a steering shaft, a steering rack, and the like, which are not illustrated, by being rotationally operated by the driver. The notification unit 5 is a well-known component which notifies the driver of a message or the like, which will be described later, through video display and sound output. The notification unit 5 may be a component which utilizes a component in common with in-vehicle audio equipment or a car navigation system. The support switch 7 is a switch to be used by the driver to instruct the control unit 10 to perform a driving support process which will be described later. When the notification unit 5 is configured by utilizing a touch panel or the like, the support switch 7 may be configured by utilizing the touch panel.

The notification unit 5 and the support switch 7 are electrically connected to the control unit 10 which performs the driving support process. The millimeter wave radar 21, the camera 23, the operation detection unit 25, the steering driving unit 27, and the acceleration/deceleration control unit 29 are also electrically connected to the control unit 10.

The millimeter wave radar 21 is provided at a predetermined position in the own vehicle so as to be able to detect an obstacle (for example, other vehicles) ahead of the vehicle. The camera 23 is provided at a predetermined position in the own vehicle so as to be able to detect an obstacle ahead of the vehicle and boundaries of the lane in which the own vehicle is traveling. Examples of the boundaries of the lane include white lines. A description will be provided below assuming that the boundaries of the lane are white lines.

The operation detection unit 25 and the steering driving unit 27 are provided as components related to the steering wheel 3. The operation detection unit 25 detects steering torque Td applied to the steering wheel 3 by the driver. The steering torque Td is set to a positive or a negative value in accordance with the direction thereof. For example, the clockwise direction is set as negative, and the counterclockwise direction is set as positive. The steering driving unit 27 drives the steered wheel 30 by driving the steering wheel 3 via a motor or the like, which is not illustrated. The acceleration/deceleration control unit 29 accelerates or decelerates the vehicle by driving a throttle valve, a wheel cylinder, or the like, which are not illustrated. Note that the acceleration/deceleration control unit 29 drives neither an accelerator pedal nor a brake pedal which are not illustrated and which are to be used by the driver to operate the throttle valve, the wheel cylinder, or the like, to drive that.

The control unit 10 is configured mainly by a well-known microcomputer including a CPU 10A and a semiconductor memory 10B such as a RAM, a ROM, and a flash memory. Various kinds of functions of the control unit 10 are implemented by the CPU 10A reading program data stored in a non-transitory tangible recording medium to execute programs. In this example, the semiconductor memory 10B corresponds to a non-transitory tangible recording medium in which digital program data is stored so as to be able to be read out. Further, through execution of the programs, methods corresponding to the programs are performed. There may be one microcomputer or a plurality of microcomputers which constitute the control unit 10.

As illustrated in FIG. 1, the control unit 10 includes a state recognition unit 11, a driving support unit 12, a switching control unit 13, a threshold lowering unit 14, and a reliability detection unit 15 as components having functions which are implemented by the CPU 10A executing the programs. A technique for implementing these elements, constituting the control unit 10, is not limited to software, and part or all of the elements may be implemented using hardware including a combination of logic circuits, analog circuits, or the like.

The state recognition unit 11 is configured to recognize an obstacle around the vehicle, and a position and an angle of the vehicle with respect to white lines, based on detection results of the millimeter wave radar 21 and the camera 23. The driving support unit 12 is configured to automatically control a traveling direction and speed of the vehicle via the steering driving unit 27 and the acceleration/deceleration control unit 29 in accordance with a recognition result by the state recognition unit 11 under condition that the driver is not operating an operation unit such as the steering wheel 3 or the accelerator pedal. Note that the driving support unit 12 can execute control such that only the traveling direction of the vehicle is controlled via the steering driving unit 27 and the speed of the vehicle is caused to respond to the driver's operation of the accelerator pedal. Further, the driving support unit 12 can perform control such that only the speed of the vehicle is controlled via the acceleration/deceleration control unit 29 and the traveling direction is caused to respond to the driver's operation of the steering wheel 3.

Techniques related to automated driving are classified into a level 1 (safety driving support system), levels 2 and 3 (semi-automated traveling system), and a level 4 (fully automated traveling system) in accordance with levels of automation. The content is described in, for example, "Cross-ministerial Strategic Innovation Promotion Program, Automated Driving System" released in May, 2015 from the Cabinet Office. As described above, the driving support unit 12 can perform automated driving corresponding to any of the levels 1 to 4 according to the driver's selection. However, in the present embodiment, "automatically" refers to control through which a target control amount (for example, a steering angle) can be set under the condition that the driver does not operate the operation unit, without including the control which is performed to correct operation only when the operation with respect to the operation unit is performed. In the following description, a case will be described as an example where the driving support unit 12 controls a traveling direction of the vehicle by driving the steering wheel 3 and the steered wheel 30 via the steering driving unit 27 so that the vehicle does not deviate across white lines. It goes without saying that, this control may include control for avoiding an obstacle by deliberately deviating from the white lines when an obstacle is detected ahead of the vehicle.

The switching control unit 13 is configured to cause the operation unit related to driving support performed by the driving support unit 12 to cease the driving support and switch a driving state to manual driving when operating force or an operation amount of operation performed by the driver with respect to the operation unit exceeds a threshold. Manual driving refers to a driving state in which the in-vehicle equipment which had been driven by the driving support is instead operated in response to the driver's operation of the operation unit. In this example, the operation unit is the steering wheel 3, and the in-vehicle equipment is the steered wheel 30.

The threshold lowering unit 14 is configured to lower the above-mentioned threshold when the reliability detection unit 15 detects that reliability of the driving support by the driving support unit 12 has degraded (hereinafter, also referred to as a failure). The reliability detection unit 15 may be a so-called failure detection unit which detects an abnormality through well-known diagnosis. Further, as in the present example, when white-line deviation is suppressed in accordance with video captured by the camera 23, the reliability detection unit 15 may detect the reliability degradation based on definition or the like of the video captured by the camera 23.

[1-2. Process]

Figure 2:
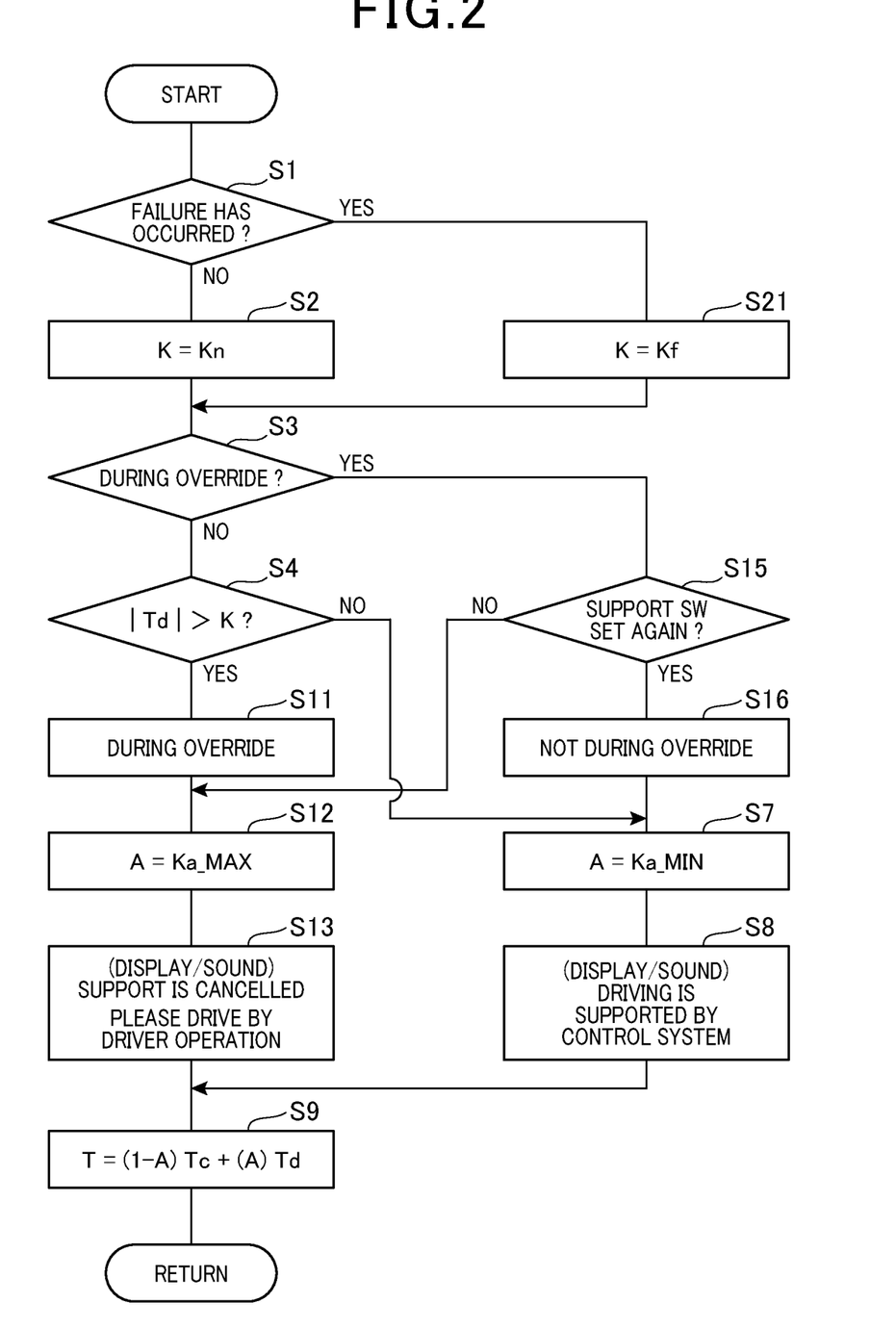
FIG. 2 is a flowchart illustrating a driving support process in the driving support apparatus.

The driving support process performed by the control unit 10 will be described next with referenced to the flowchart in FIG. 2. This process is repeatedly performed at predetermined intervals by the CPU 10A of the control unit 10 executing programs stored in the ROM of the same control unit 10 when the start of driving support is instructed by the driver via the support switch 7.

In this process, first, in S1, it is determined whether a failure has been detected by the reliability detection unit 15. If a failure has not been detected, it is determined as No in S1, and the process proceeds to S2. In S2, as processing performed by the threshold lowering unit 14, a threshold K is set to Kn, which is an ordinarily used set value. Note that Kn is a positive value. In the following S3, it is determined whether override is being performed. Override is a driving state in which the driving support has been cancelled and manual driving is being performed. This processing in S3 may be performed with reference to a state of an override flag which is set during override. Since the override flag is reset when the process starts, it is determined as No in S3, and the process proceeds to S4.

In S4, it is determined whether an absolute value of steering torque Td detected via the operation detection unit 25, that is, an absolute value of torque applied to the steering wheel 3 by the driver has exceeded a threshold K. Since the driver does not apply great steering torque Td, which exceeds the threshold K, to the steering wheel 3 at the start of the driving support, it is determined as No in S4, and the process proceeds to S7. In S7, a coefficient A is set to the minimum value Ka_MIN. Here, Ka_MIN may be, for example, 0.

In S8 following S7, the driver is notified of a message saying "Driving is supported by the control system" through display and sound via the notification unit 5, and the process proceeds to S9. In S9, total torque T which should be applied to the steering wheel 3 is calculated using an equation of T=(1−A)Tc+(A)Td, and the process is suspended. Note that Tc in the above equation is torque to be applied to the steering wheel 3 by the driving support unit 12 via the steering driving unit 27 for the control of suppressing white-line deviation. Therefore, in the case where Ka_MIN=0, T=Tc is set in S9. This means that, when override is not being performed (that is, while the driving support is performed), even if steering torque Td equal to or less than the threshold K is applied to the steering wheel 3 by the driver, the steering driving unit 27 operates so that the steering torque Td is cancelled out.

On the other hand, if it is determined as |Td|>K (that is, Yes) in S4, the process proceeds to S11, and an override flag indicating that override is being performed is set. In the following S12, the coefficient A is set to the maximum value Ka_MAX. Here, Ka_MAX may be, for example, 1.0.

In S13 following S12, the driver is notified of a message using a display and a sound saying "Support is cancelled. Please drive by driver operation" via the notification unit 5, and the processing proceeds to the above-mentioned S9. Therefore, in the case where Ka_MAX=1.0, T=Td is set in S9. This means that, during override, the steering torque Td applied by the driver directly becomes total torque T applied to the steering wheel 3.

In this manner, if the driving state becomes an override, it is determined as Yes in the above-mentioned S3, and the processing proceeds from S3 to S15. In S15, it is determined whether driving support is set again by the support switch 7. If the driving support is not set again (that is, in the case of No), the process proceeds to the above-mentioned S12, and the above-mentioned driving state of override is continued.

On the other hand, if driving support is set again by the support switch 7, and it is determined as Yes in S15, an override flag is reset in S16, and after a fact that override is not being performed is stored at the control unit 10, the process proceeds to the above-mentioned S7. Then, after a notification indicating that driving support is being performed as mentioned above is made in S8, torque Tc applied via the steering driving unit 27 is reflected in the total torque T in S9, and driving support is performed.

Further, in the present embodiment, if it is determined that there is a failure (that is, Yes) in S1, the process proceeds to S21. In S21, as the processing by the threshold lowering unit 14, the threshold K is set to Kf which is a set value at the time of failure. Note that 0<Kf<Kn. Therefore, even when the driver applies relatively weak steering torque Td less than Kn to the steering wheel 3, if the absolute value of the steering torque Td exceeds Kf, it is determined as Yes in S4, and the driving state proceeds to an override state. Note that, among the above-described processing, S4, S7, S9 and S12 are processing performed by the switching control unit 13.

[1-3. Effects]

According to the first embodiment described above in detail, the following advantageous effects can be obtained.

(1A) In the present embodiment, when the reliability detection unit 15 detects that reliability of the driving support has degraded, and it is determined in S1 that there is a failure, the threshold is lowered from Kn to Kf. Then, even if the driver does not operate the steering wheel 3 with a relatively large steering torque Td, since the absolute value of the steering torque Td exceeds the threshold K (that is, Kf), it is possible to cease driving support related to steering and switch a driving state to manual driving. Therefore, when the reliability of the driving support has degraded, it is possible to cease the driving support and switch the driving state to manual driving more smoothly.

Figure 3:
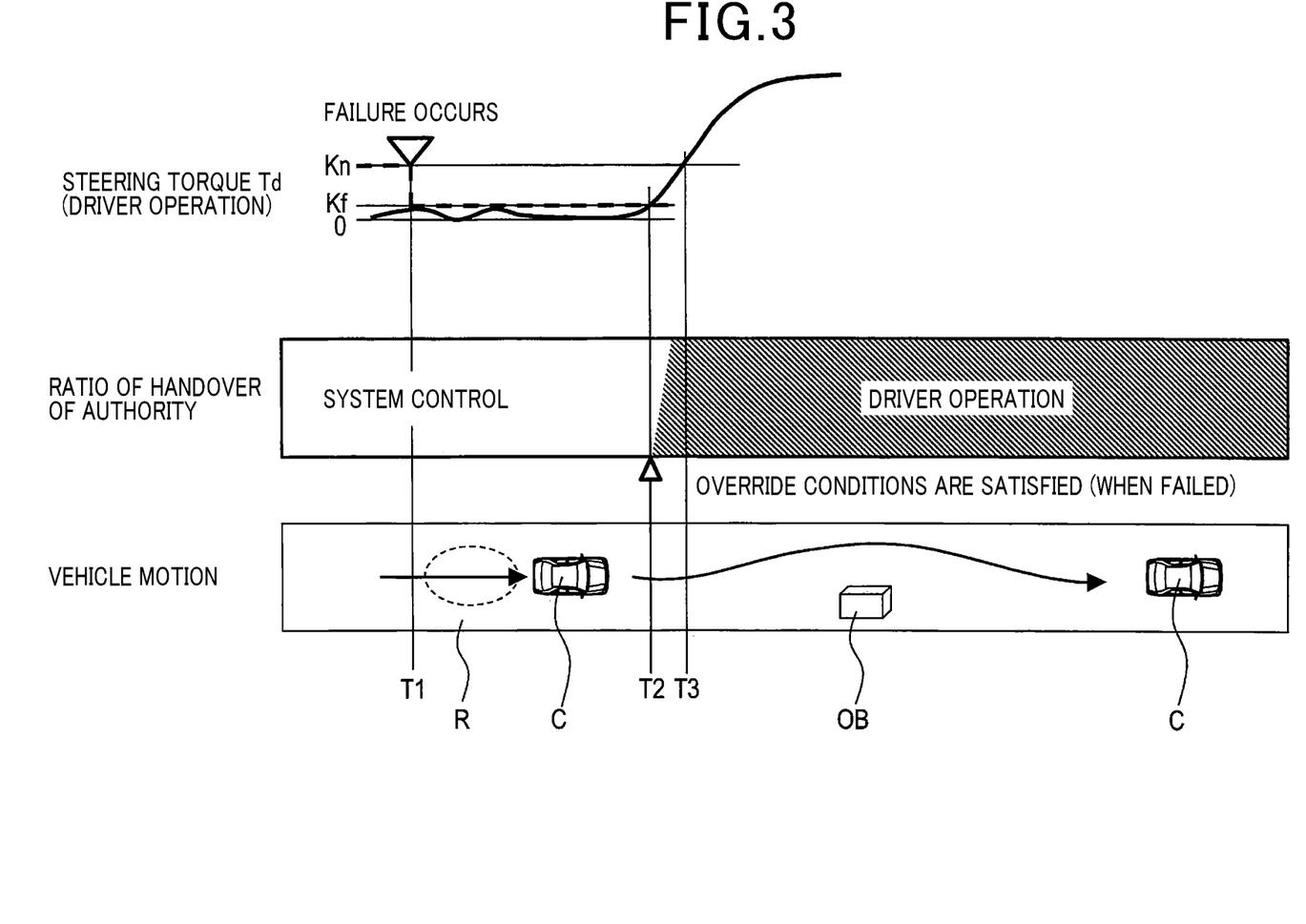
FIG. 3 is an explanatory diagram illustrating effects of the driving support process.

The bottom portion in FIG. 3 illustrates vehicle motion when a failure occurs at a time point T1 in the own vehicle C which is travelling on a road R, reliability of the driving support degrades, and, thereafter, an obstacle OB is avoided by the driver through manual driving.

Further, a thick solid line in the top portion in FIG. 3 indicates the steering torque Td of the driver. FIG. 3 illustrates a scene in which the driver who has noticed a failure immediately after the time point T1 starts operation of the steering wheel 3 and, thereafter, suddenly increases the steering torque from around a time point T2 to avoid the obstacle OB.

The amount of the steering torque is small immediately after the time point T1, the override conditions (|Td|>K (that is, |Td|>Kf)) are not satisfied, and the driving support is continued in vehicle motion. Around the time point T2, if the threshold K is kept fixed at Kn, the driving state is not switched to manual driving so as to hand over authority of the steering to driver operation until |Td|>Kn at a time point T3 which is somewhat later than the time point T2. In contrast to this, in the present embodiment, as indicated with a thick dashed line in the top portion in FIG. 3, the threshold K is lowered from Kn to Kf at the time point T1 at which a failure has occurred. Therefore, the override condition of |Td|>K (that is, |Td|>Kf) is satisfied at the time point T2 which is earlier than T3, and authority is handed over to driver operation. That is, manual driving can be performed by smoothly shifting the driving state to an override. In the present embodiment, in this manner, when a failure has occurred, it is possible to smoothly cease the driving support and switch the driving state to manual driving. Therefore, as indicated with an arrow in the bottom portion, the own vehicle C can easily avoid the obstacle OB.

(1B) Moreover, in the present embodiment, the driver is notified via the notification unit 5 through processing in S13 or S8 that the driving support is ceased and the driving state is switched to manual driving (that is, override) or that driving support is started. Therefore, the driver can easily understand the handover of authority of the own vehicle, so as to further improve safety of driving.

[2. Second Embodiment]
[2-1. Differences from First Embodiment]

In the second embodiment, the basic configuration is similar to that of the first embodiment. Therefore, descriptions of the common components are omitted to focus description on differences. Also, since the same reference signs as those in the first embodiment indicate the same components, the preceding description should be referred to for such components.

Figure 4:
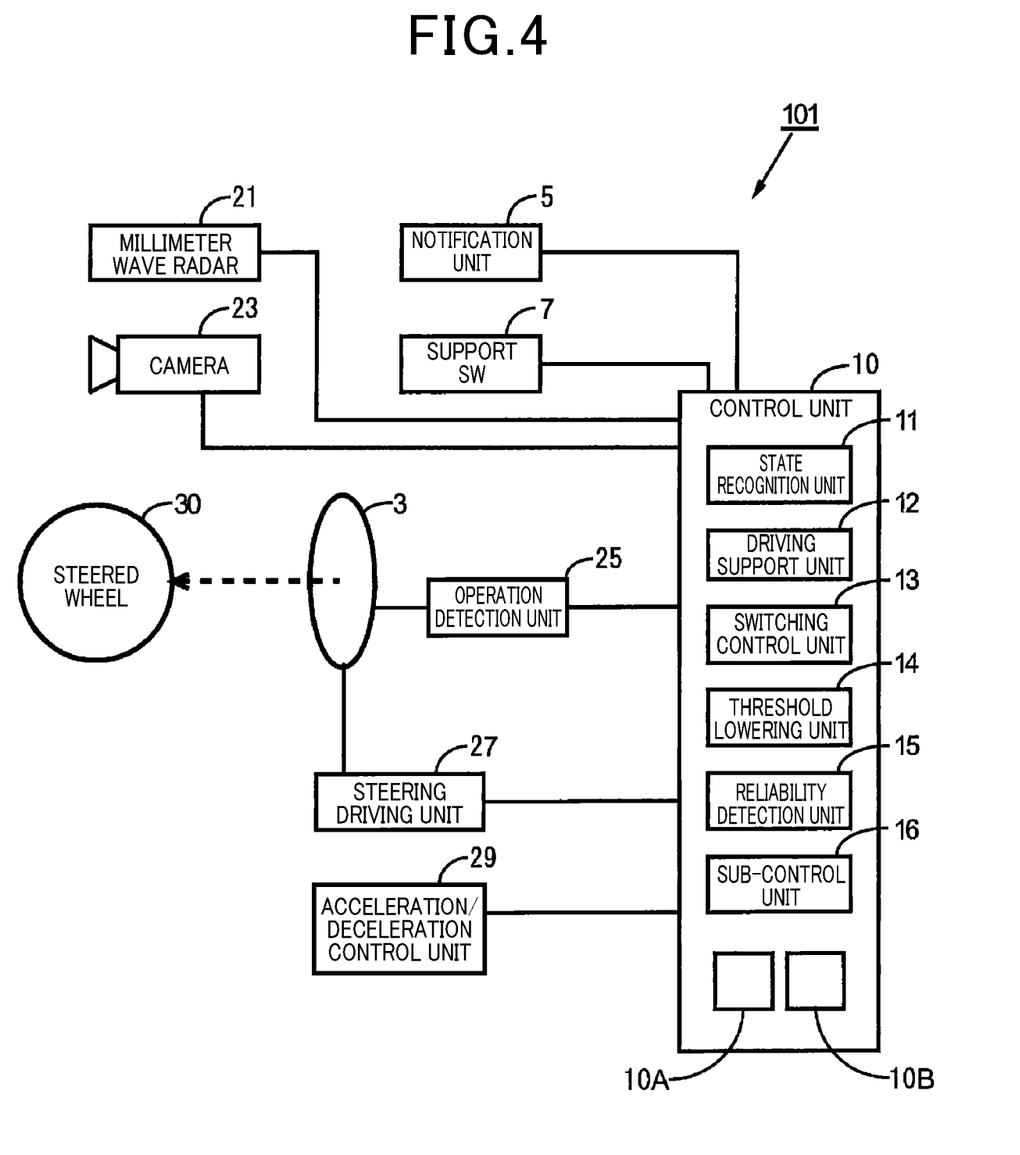
FIG. 4 is a block diagram illustrating a configuration of a driving support apparatus according to a second embodiment.

As illustrated in FIG. 4, a driving support apparatus 101 in the second embodiment is different from the driving support apparatus 1 in the first embodiment in that the control unit 10 further includes a sub-control unit 16. The sub-control unit 16 is also provided in the control unit 10 as a component having a function implemented by the CPU 10A executing programs.

[2-2. Process]

Figure 5:
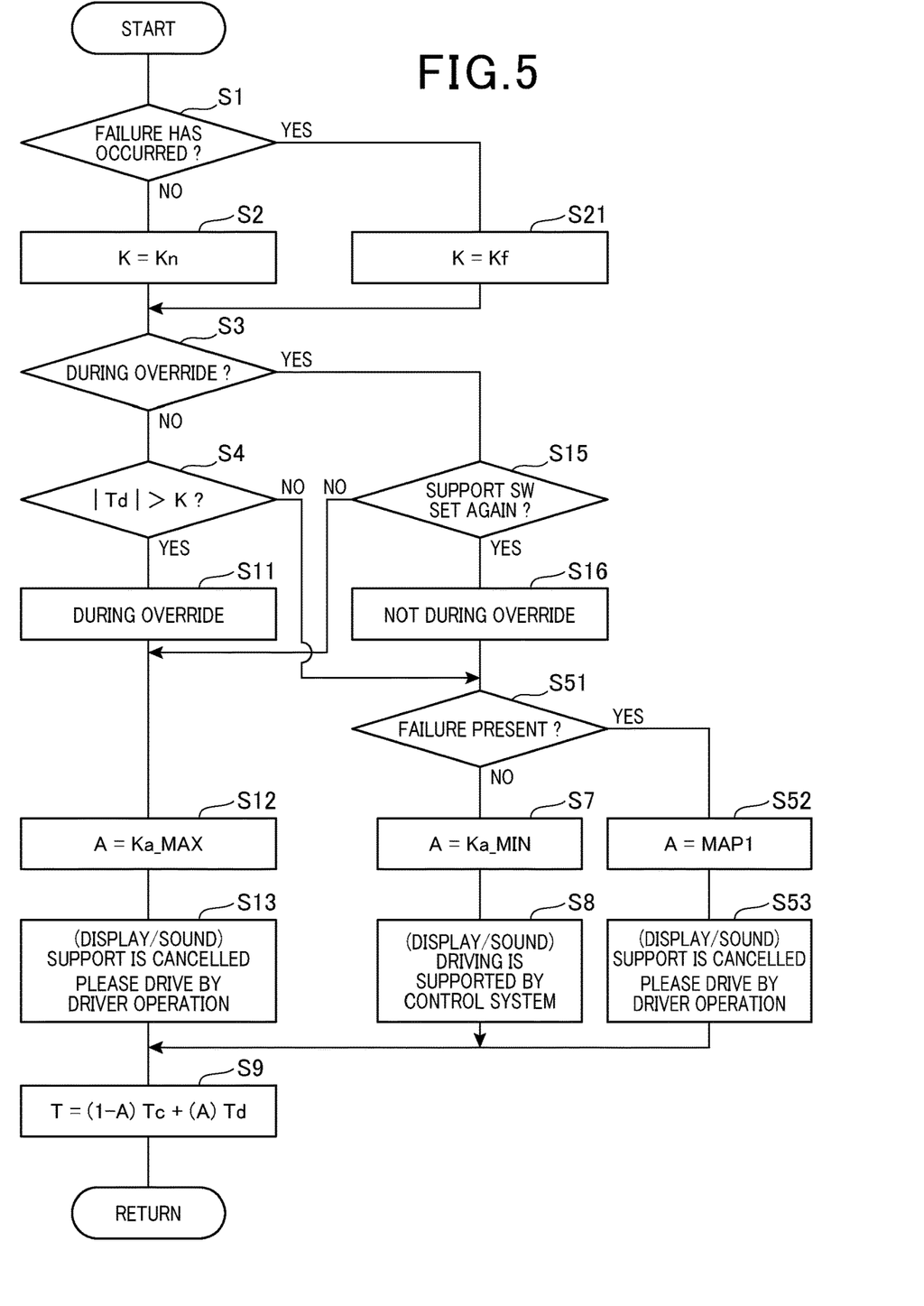
FIG. 5 is a flowchart illustrating driving support process in the driving support apparatus.

Also in a driving support process performed by the control unit 10, processing in S51, S52 and S53 illustrated in FIG. 5 in addition to the processing in the first embodiment is performed as processing by the sub-control unit 16. The driving support process illustrated in FIG. 5 is similar to the driving support process in the first embodiment illustrated in FIG. 3 except that the above S51 to S53 are added.

That is, in the present embodiment, when override is not being performed, prior to performing driving support through processing in S7 to S9, it is determined whether there is a failure in S51. This determination may be processing for storing a determination result in S1 in a form of a flag or the like and just reading out the determination result, or may be processing for newly determining whether there is a failure, independent of S1.

Figure 6:
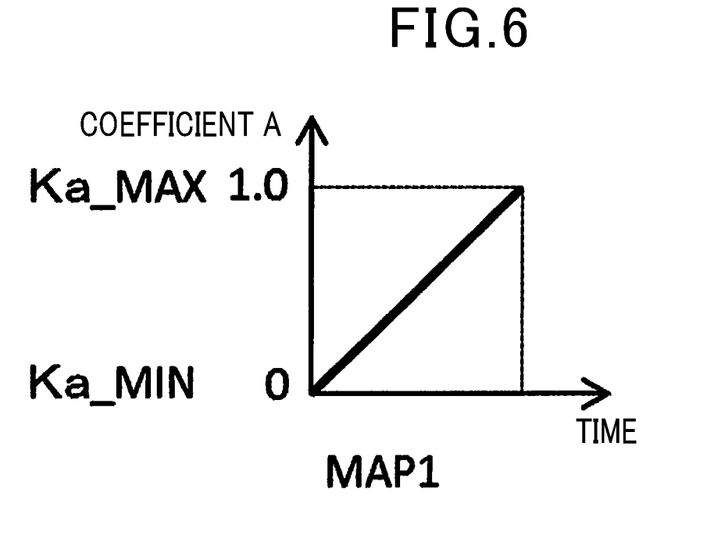
FIG. 6 is an explanatory diagram illustrating a map used in the driving support process.

If there is no failure, the process proceeds to the above-mentioned S7, and processing similar to that in the first embodiment is performed. On the other hand, if there is a failure, the process proceeds to S52. In S52, processing is performed for increasing the coefficient A from Ka_MIN (for example, 0) to Ka_MAX (for example, 1.0) in a linear functional manner according to the elapsed time based on the MAP 1 illustrated in FIG. 6. Note that time in the horizontal axis in the MAP 1 indicates the elapsed time from the occurrence of a failure. In S53 following S52, a notification indicating that the driving support is cancelled is made in a similar manner to S13, and the process proceeds to the above-mentioned S9.

Figure 7:
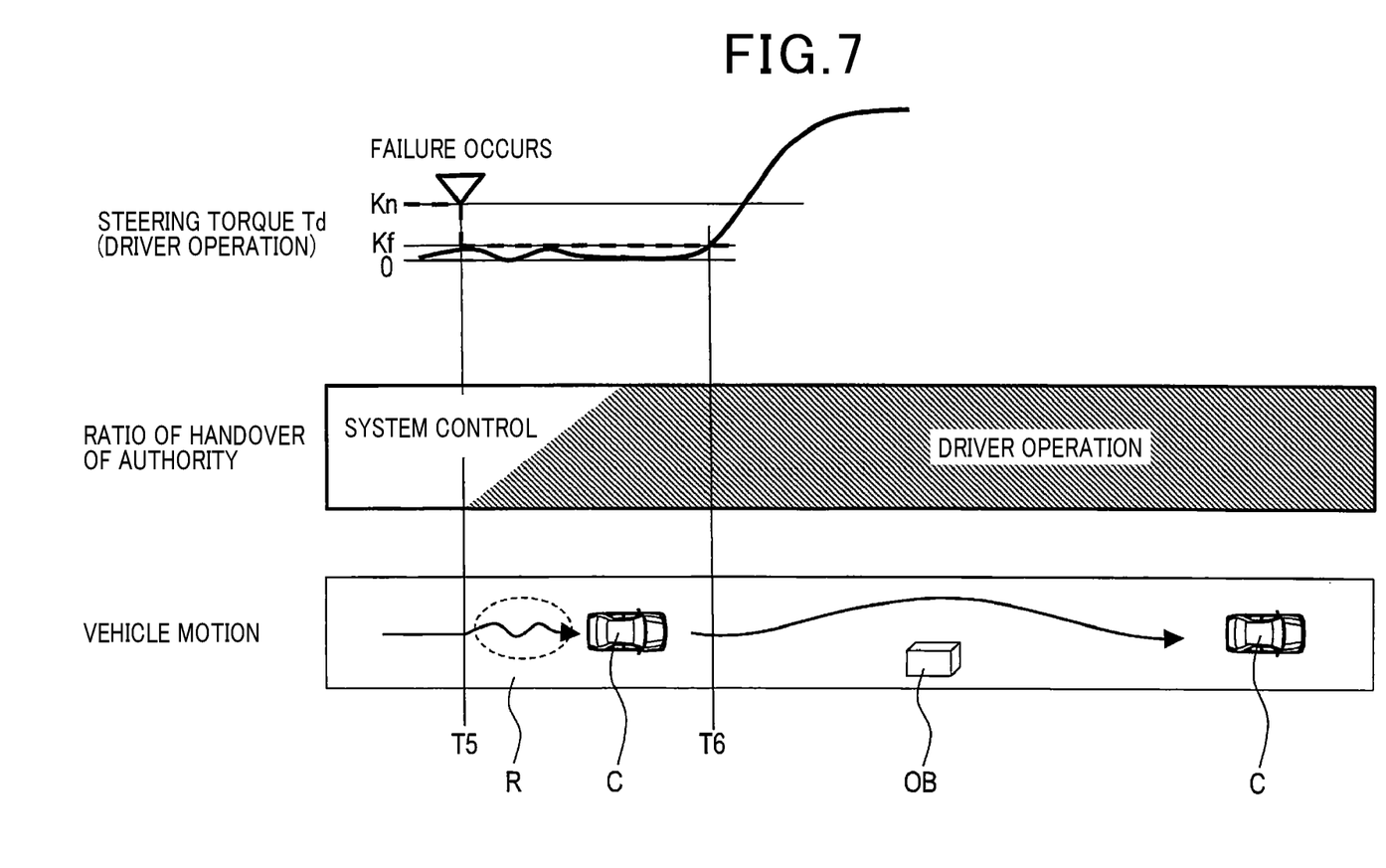
FIG. 7 is an explanatory diagram illustrating effects of the driving support process.

In the present embodiment, when although a failure has occurred, the absolute value of the steering torque Td has not yet exceeded the threshold K (that is, Kf), the processing in S52 and S53 is performed. That is, the coefficient A gradually increases from 0 to 1.0 depending on the elapsed time from the occurrence of the failure. Consequently, as illustrated in FIG. 7, a ratio of the torque Tc applied to the steering wheel 3 by the above driving support (that is, system control) in the total torque T (that is, a ratio of handover of authority) gradually decreases from a time point T5 at which a failure has occurred. In the example in FIG. 7, handover of authority to driver operation has already been completed at a time point T6 at which the absolute value of the steering torque Td exceeds the threshold K (that is, Kf). That is, at the time point T6, the driving state has completely shifted to override, and manual driving can be performed.

Figure 8:
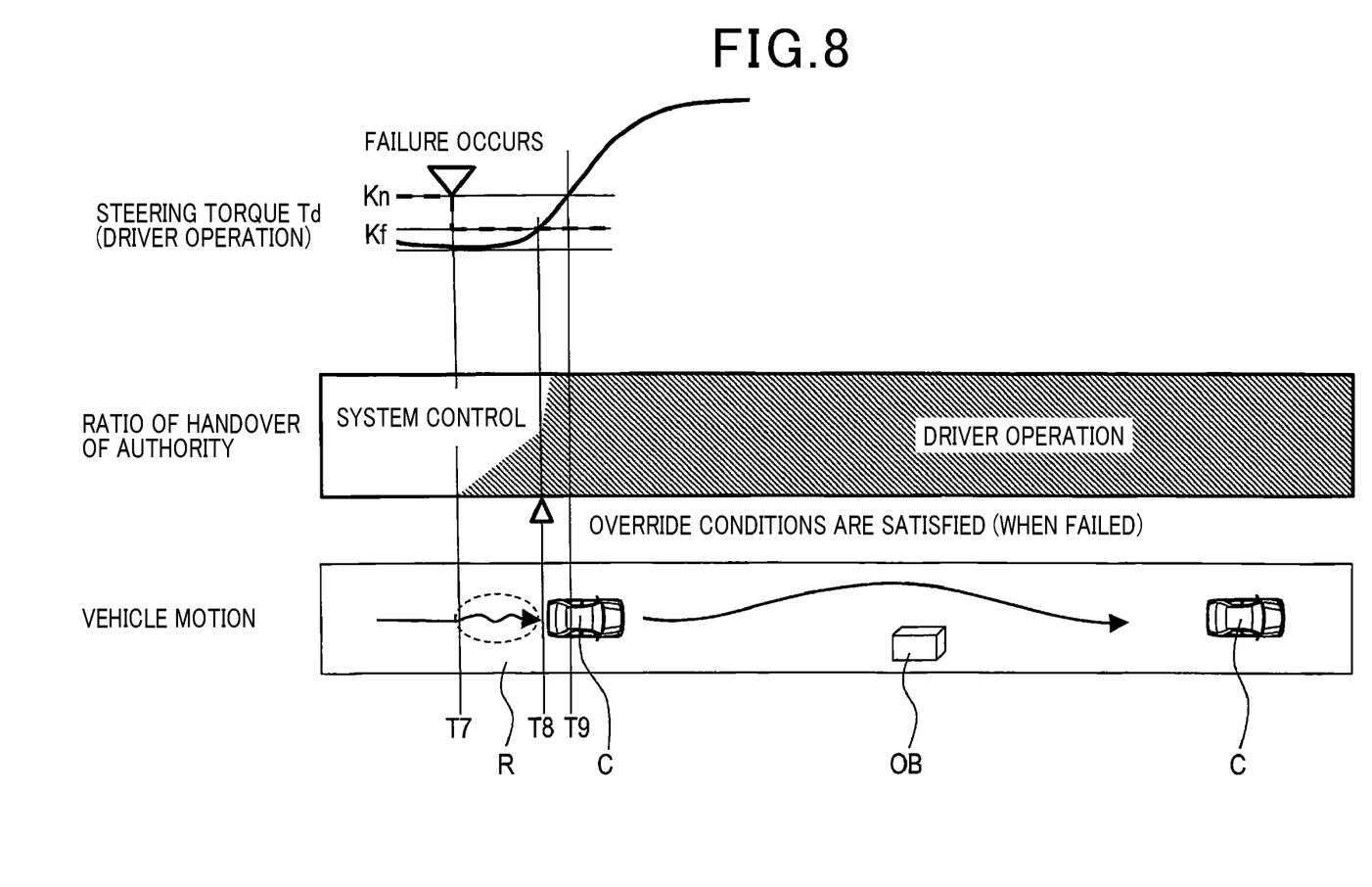
FIG. 8 is an explanatory diagram illustrating other effects of the driving support process.

Further, FIG. 8 illustrates an example of when a failure has occurred at a time point T7, and the absolute value of the steering torque Td exceeds the threshold K at a time point T8 at which the coefficient A is gradually increasing. Also in this example, the absolute value of the steering torque Td exceeds the threshold K (that is, Kf) at the time point T8 earlier than a time point T9 at which the absolute value exceeds Kn. In this case, although authority is gradually handed over from the time point T7, the handover of the authority is rapidly completed from the time point T8 at which the absolute value of the steering torque Td exceeds the threshold K.

[2-3. Effects]

According to the second embodiment described above in detail, in addition to the above-mentioned effects (1A) and (1B) of the first embodiment, the following effects can be obtained.

(2A) In the present embodiment, when a failure has occurred, even if the absolute value of the steering torque Td does not exceed the threshold K, the steering torque Td is reflected in the total torque T applied to the steering wheel 3. That is, the driving support related to the total torque T is reduced. Therefore, operation by the driver is reflected in a steering state of the own vehicle from an earlier time point, so as to further improve the safety of the driving.

(2B) Moreover, a ratio of reflection of the steering torque Td in the total torque T gradually increases depending on the elapsed time. Therefore, the processing of ceasing the driving support and switching to the driving state to manual driving is performed further smoothly, so as to more favorably suppress a feeling of strangeness experienced by the driver.

[3. Other Embodiments]

Embodiments of the present disclosure have been described so far. However, the present disclosure is not limited to the above-described embodiments, and may take various forms.

(3A) In the above-described each embodiment, the threshold K is set with respect to the steering torque Td (that is, operating force) applied by the driver to the steering wheel 3. However, the threshold K is not limited to this. For example, the threshold K may be set with respect to a steering angle (that is, an operation amount) such that the driving state shifts to override if the steering wheel 3 is turned by equal to or greater than a predetermined degree.

(3B) In the second embodiment, the ratio of reflection of the steering torque Td in the total torque T gradually increases according to a linear functional manner depending on the elapsed time. However, the increase of the ratio is not limited to this. For example, the above ratio may increase in a stepwise manner, or may be a fixed value in accordance with, for example A=0.6 or the like, until the absolute value of the steering torque Td exceeds the threshold K.

(3C) In the above-described each embodiment, the steered wheel 30, which is in-vehicle equipment, is indirectly driven via the steering wheel 3, which is an example of the operation unit. The driving of the steered wheel 30 is not limited to this. For example, the steered wheel 30 may be directly driven. Further, when the in-vehicle equipment is a throttle valve, a wheel cylinder, or the like, it may be directly driven in such a manner that it is driven by the acceleration/deceleration control unit 29. In this case, an accelerator pedal and a brake pedal as operation units do not have to be driven. Further, even if the driving support is such that the steered wheel 30 is directly or indirectly driven, the driving support is not limited to control of suppressing white-line deviation, and, there may be various kinds of driving support, for example, for parallel parking.

(3D) The functions of one component in the above-described embodiment may be distributed to a plurality of components, or the functions of a plurality of components may be integrated into one component. Further, part of the components in the above-described embodiments may be omitted. Additionally, at least part of the configuration of an above-described embodiment may be added to or replaced with the configuration of another above-described embodiment. The embodiments of the present disclosure include any mode included in the technical spirit specified only by the language of the claims.

(3E) The present disclosure can be implemented in various forms such as a system which includes the driving support apparatus as a component, a program for allowing a computer to function as the driving support apparatus, a medium storing this program, and a driving support method, as well as the above-described driving support apparatus.

The invention claimed is:

1. A driving support apparatus comprising:
a driving support unit configured to perform driving support for automatically driving in-vehicle equipment related to traveling of a vehicle under a condition that an operation unit of the vehicle is not operated by a driver of the vehicle;
a switching control unit configured to cease the driving support by the driving support unit and switch a driving state from driving in which the driving support is performed to manual driving in which the in-vehicle equipment is driven in response to operation of the operation unit by the driver, according to input from an operation detection unit which detects operating force or an operation amount of operation performed by the driver with respect to the operation unit, in a case where the operating force or the operation amount exceeds a threshold when the driving support is performed by the driving support unit;
a reliability detection unit configured to detect degradation of reliability of the driving support by the driving support unit;
a threshold lowering unit configured to lower the threshold in a case where the reliability detection unit detects that the reliability has degraded when the driving support is performed; and
a sub-control unit configured to, when the reliability detection unit detects that the reliability has degraded when the driving support is performed, if the operation unit is operated with the operating force or the operation amount which falls within a range not exceeding the threshold, at least partially reflect the operation in driving of the in-vehicle equipment by the driving support unit.

2. The driving support apparatus according to claim 1, wherein the sub-control unit is configured to, when the reliability detection unit detects that the reliability has degraded, gradually increase a ratio of reflection of the operation in driving of the operation unit by the driving support unit depending on elapsed time.

3. The driving support apparatus according to claim 1, wherein
the in-vehicle equipment is a steered wheel,
the operation unit is a steering wheel, and
the driving support unit is configured to drive the steered wheel via the steering wheel.

4. The driving support apparatus according to claim 1, further comprising:
a notification unit configured to notify the driver that the driving support has been ceased by the switching control unit, and the driving state has been switched to the manual driving.

5. A driving support method comprising:
executing driving support for automatically driving in-vehicle equipment related to traveling of a vehicle under a condition that an operation unit of the vehicle is not operated by a driver of the vehicle;
ceasing the driving support and switching a driving state from driving in which the driving support is performed to manual driving in which the in-vehicle equipment is driven in response to operation of the operation unit by the driver, according to input from an operation detection unit which detects operating force or an operation amount of operation performed by the driver with respect to the operation unit, in a case where the operating force or the operation amount exceeds a threshold when the driving support is performed;
lowering the threshold in a case where degradation of reliability of the driving support is detected; and
at least partially reflecting the operation in driving of the in-vehicle equipment, when detecting that the reliability has degraded when the driving support is performed, and if operated with the operating force or the operation amount which falls within a range not exceeding the threshold.

6. A recording medium in which digital program data is stored so as to be allowed to be read out and which allows a CPU to read out and execute the program data to function as:
a driving support unit configured to perform driving support for automatically driving in-vehicle equipment related to traveling of a vehicle under a condition that an operation unit of the vehicle is not operated by a driver of the vehicle;

a switching control unit configured to cease the driving support by the driving support unit and switch a driving state from driving in which the driving support is performed to manual driving in which the in-vehicle equipment is driven in response to operation of the operation unit by the driver, according to input from an operation detection unit which detects operating force or an operation amount of operation performed by the driver with respect to the operation unit, in a case where the operating force or the operation amount exceeds a threshold when the driving support is performed by the driving support unit;

a reliability detection unit configured to detect degradation of reliability of the driving support by the driving support unit a threshold lowering unit configured to lower the threshold in a case where the reliability detection unit detects that the reliability has degraded when the driving support is performed; and a sub-control unit configured to, when the reliability detection unit detects that the reliability has degraded when the driving support is performed, if the operation unit is operated with the operating force or the operation amount which falls within a range not exceeding the threshold, at least partially reflect the operation in driving of the in-vehicle equipment by the driving support unit.

* * * * *